US011042457B2

(12) United States Patent
Schimmelpfeng et al.

(10) Patent No.: US 11,042,457 B2
(45) Date of Patent: Jun. 22, 2021

(54) APPLICATION UPDATES

(71) Applicant: ENTIT SOFTWARE LLC, Sanford, NC (US)

(72) Inventors: Joern Schimmelpfeng, Boeblingen (DE); Harald Pfaender, Boeblingen (DE); Artiona Bogo, Boeblingen (DE)

(73) Assignee: Micro Focus LLC, Santa Clara, CA (US)

( * ) Notice: Subject to any disclaimer, the term of this patent is extended or adjusted under 35 U.S.C. 154(b) by 102 days.

(21) Appl. No.: 15/544,133

(22) PCT Filed: Jan. 29, 2015

(86) PCT No.: PCT/US2015/013443
§ 371 (c)(1),
(2) Date: Jul. 17, 2017

(87) PCT Pub. No.: WO2016/122511
PCT Pub. Date: Aug. 4, 2016

(65) Prior Publication Data
US 2018/0011771 A1   Jan. 11, 2018

(51) Int. Cl.
*G06F 11/30* (2006.01)
*G06F 8/65* (2018.01)
*G06F 9/445* (2018.01)

(52) U.S. Cl.
CPC ............ *G06F 11/3006* (2013.01); *G06F 8/65* (2013.01); *G06F 9/44505* (2013.01);
(Continued)

(58) Field of Classification Search
None
See application file for complete search history.

(56) References Cited

U.S. PATENT DOCUMENTS 6,557,028 B2   4/2003   Cragun
8,306,729 B2   11/2012  Liu
(Continued)

FOREIGN PATENT DOCUMENTS

WO   WO-2012121854   9/2012

OTHER PUBLICATIONS

International Searching Authority, International Search Report and Written Opinion, PCT/US2015/013443; dated Sep. 1, 2015, 10 pgs.
(Continued)

*Primary Examiner* — Younes Naji

(57) ABSTRACT

Described herein are example systems and computer-implemented methods for monitoring changes to an application. For example, information regarding a change made to an aspect of an application may be received by a processor. It may be determined if a similarity of the change to a cluster of changes related to the aspect is within a change threshold. Further, the change may be associated with the cluster of changes when the similarity of the change is within the change threshold. It may be further determined if a metric based on a number of changes associated with the cluster of changes is within a cluster range. When the metric within the cluster range, a prototype change may be extracted from the cluster of changes. The application may be updated based on the prototype change when the metric is within the cluster range.

16 Claims, 5 Drawing Sheets

(52) U.S. Cl.
CPC ........ *G06F 11/302* (2013.01); *G06F 11/3003* (2013.01); *G06F 11/3051* (2013.01); *G06F 11/3079* (2013.01); *G06F 2201/81* (2013.01); *G06F 2201/865* (2013.01)

(56) References Cited

U.S. PATENT DOCUMENTS

| | | | |
|---|---|---|---|
| 9,134,961 B1* | 9/2015 | Cohen | G06F 9/44505 |
| 9,201,774 B1* | 12/2015 | Cohen | G06F 11/3604 |
| 2010/0131193 A1 | 5/2010 | Shnyr | |
| 2010/0306738 A1 | 12/2010 | Verma et al. | |
| 2011/0154216 A1* | 6/2011 | Aritsuka | G06F 9/451 |
| | | | 715/745 |
| 2012/0096065 A1 | 4/2012 | Suit et al. | |
| 2012/0151020 A1 | 6/2012 | Bolay et al. | |
| 2013/0151332 A1* | 6/2013 | Yan | G06Q 30/0243 |
| | | | 705/14.42 |
| 2013/0212067 A1* | 8/2013 | Piasecki | G06F 16/1787 |
| | | | 707/620 |
| 2013/0263111 A1* | 10/2013 | Boss | G06F 8/61 |
| | | | 717/176 |
| 2013/0303134 A1 | 11/2013 | Ramnani | |
| 2014/0222520 A1 | 8/2014 | Karanth et al. | |
| 2014/0372980 A1* | 12/2014 | Verma | G06F 9/4451 |
| | | | 717/121 |

OTHER PUBLICATIONS

Ralf H. Guting et al; Advances in Spatial Databases; https://books.google.co.in/books?; Jul. 20-23, 1999.

\* cited by examiner

APPLICATION UPDATES

BACKGROUND

Many different types of applications that execute an computing devices are made by developers and deployed by various customers. Some of these applications allow for customizations to be made by the customers. For example, the applications may be setup using certain default settings or configurations. A customer using the application may be able to change these default settings or configurations to suit the specific needs of the customer, for example, if the "out of box" experience of the application is inadequate for the customer's specific needs.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to systems and methods for monitoring changes to an application. These examples may be used to determine which changes are made to an application by users of the application, and also automatically determine the similarity of changes made to the application by different users. Based on the similarity of the changes made to the application by different users, the application may be updated to incorporate a change similar to the changes made by the different users. Accordingly, the out of box experience of the applications may be more in line with the needs of a greater number of customers.

In the examples given below, the application referred to is a monitoring application configured to monitor the computer systems of a customer. It should be noted, however, that the methods and systems described herein may similarly be used with other types of applications, as would be understood by one of ordinary skill in the art.

Figure 1A:
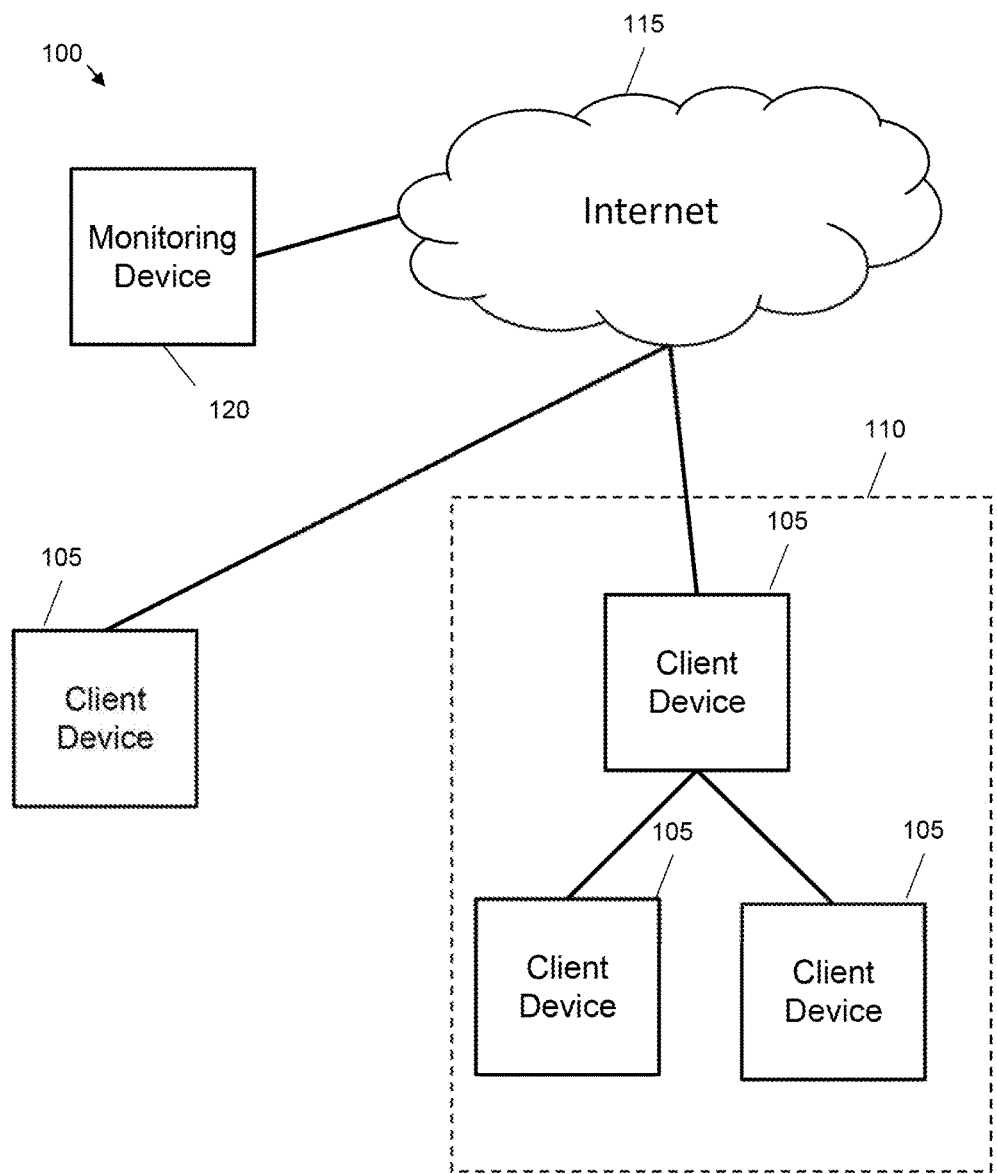
FIG. 1A shows an example of a network for monitoring changes to an application.

FIG. 1A shows an example of a network 100 for monitoring changes to an application. As shown, the network 100 includes a number of client devices 105. Each of the client devices 105 may be a computing device (e.g., workstation server, mobile device, etc.), multiple computing devices (e.g., in a network configuration), sensor based device, input/output (IO) device, database, etc. A single customer may have a number of client devices 105, for example the client devices 105 bounded by box 110 may be controlled by a single customer. Each client device 105 may be running an application, or a portion of an application (such as a monitoring service).

The network 100 further includes a monitoring device 120. The monitoring device 120 may comprise one or more servers, or other appropriate computing device or system. The monitoring device 120 may be operated by the application developer or manufacturer of an application. As shown, the monitoring device 120 may be connected to each of the client devices 105 over a network 115, such as the Internet. In some embodiments, the monitoring device 120 may only be connected to one client device 105 for each customer. For example, the monitoring device 120 may only be connected to one of the client devices 105 in the box 110. The remaining client devices 105 in the box 110 may be interconnected, such as over a local area network (e.g., wireless or wired), such that data may be transferred between the client devices 105 in the box 110. The client device 105 connected to the monitoring device 120 may collect any changes in the application made by any of the client devices 105 in the box 110 and then send data to the monitoring device 120.

As described herein, the application itself running on the client devices 105 may be configured to determine changes in the application and send data regarding the changes to the monitoring device 120. For example, the computer program code implementing the application may comprise instructions arranged to transmit configuration settings, and/or changes in configuration settings, to the monitoring device 120. However, alternatively or additionally, another application, such as a monitoring service, may be running on the client devices 105 that determines changes in the application and sends data regarding the changes to the monitoring device 120, and may perform other similar functions as discussed with respect to the application as discussed herein. For example, the monitoring service may comprise an agent running on the client device 105 monitoring the application. In yet another example, the client devices 105 may periodically send configuration data regarding the application to the monitoring device 120, and the monitoring device 120 may determine if any changes have been made to the application by the customer. In one case, each client device 105 may access a hosted version of the application, e.g. a version of the application that is being executed on one or more remote computer server devices. In this case, the monitoring device 120 may monitor the one or more remote computer server devices and/or may form part of one or more of said devices. Any combination of these approaches, or any suitable approach, may be used to obtain data regarding changes made to the application.

Data related to the application may be evaluated for changes. For example, the application, running on the client devices 105, may be configured to gather data related to configuration or changes made by a customer utilizing the application and transmit the data to the developer or manufacturer of the application. For example, the application, when executing on the client devices 105, may be configured to initiate a connection with the server monitoring device 120 and send data regarding changes made by the customer to the monitoring device 120. The application may be configured to cause the client devices 105 to periodically send data to the monitoring device 120. Additionally, the application may be configured to cause the client devices 105 to send the data only if a change has been made.

Alternatively or additionally, the application may be configured to cause the client devices 105 to send the data as soon a change has been made. In a hosted implementation, one or more computer server devices may be arranged to send data to the monitoring device 120 in similar manner to that discussed for the client devices 105.

The monitoring device 120 may be configured to evaluate the data gathered regarding changes to the application from multiple customers using different client devices 105. In particular, the monitoring device 120 may determine a similarity of changes made by multiple customers, and provide information to an application developer or another computing device to update the application, or itself automatically update the application, to incorporate similar changes as discussed further herein.

The updates made by the application developer to the application may be stored on and distributed by one or more computer server devices (e.g., the monitoring, device 120) to the client devices 105. For example, the application, running on the client devices 105, may be configured to connect to the one or more computer server devices to determine if an update is available and download and install the update if available. The application may periodically (e.g., every day, every week, etc.) connect to search for updates. Additionally or alternatively, the application may connect to search for updates whenever the application begins executing.

In certain cases, similar changes may be grouped together into clusters of changes. For example, if two changes are evaluated and have a change metric within a given range (e.g. a "change range" or "change threshold"), they may be grouped into the same duster. The change metric may be a percentage difference or absolute difference in similarity score. Further, additional changes may be grouped into the cluster if they are also within the same change range. For example, data related to an initial change may be received by the monitoring device 120 that is not within a change range of any cluster. A new duster may be created relating to this initial change, and a change range created for the cluster, the range being measured against the initial change. Any additional changes that are within the change range of the initial change may be added to the cluster. The change range may be the same for each cluster or different for different clusters. Further, the change range may be predetermined, or configurable by a user of the monitoring device 120.

Further, clusters may be evaluated against a cluster range as changes are added to the cluster. If the number of changes or a metric associated with the number of changes added to the cluster is within the cluster range (e.g., exceeds a cluster threshold, exceeds a cluster threshold within a certain time period (e.g., within 1 day, week, month, year, etc.), etc.), an update may be made to the application that correlates to the changes within the cluster. For example, a prototype change may be extracted from the cluster and the application updated using the prototype change. In some examples, the prototype change may be the change in the cluster that has the lowest (or best) average similarity to all other changes in the cluster. For example, for each change, the similarities between the change and each other change in the cluster are calculated and averaged, and the change with the lowest (or best) average similarity is selected as the prototype change. In other examples, and depending on the similarity metric used, the average similarity need not be the lowest. For example, another value and/or metric may be representative of a change that has the highest shared similarity with all the other changes in the cluster, e.g. a change may be selected as a prototype change that has a closest average distance to all other changes in the cluster, wherein this may be the lowest average similarity or an output of another metric function. The cluster threshold may be the same for each cluster or different for different clusters. Further, the cluster range may be predetermined, or configurable by a user of the monitoring device 120. In some examples, the cluster range is a number of changes added to the cluster. In some examples, the cluster range may be a number of changes added to the cluster within a certain time period.

Aspects of the data related to the change in the application may include the following structures: management packages, configuration aspects, and templates including metric templates and logfile monitoring templates. For example, these various structures may be utilized to determine changes made to an application for monitoring a database. The examples below discuss types of such structures that may be used to determine changes made to an application for monitoring a database.

Management packages may each be a collection of configurations aspects and include a name, description, category, and list of configuration aspects that are useful to monitor a specific information technology (IT) domain, such as an operating system, database, application server, etc. An example of a management package may be a "database management package", which may be a management package that contains all the configuration aspects needed to monitor all database types. The name may be "database management package", the description may be "package to monitor databases", the category may be "databases", and the list of configuration aspects may be a list of configuration aspects needed to monitor all database types.

Configuration aspects may each be a set policy that can be used to monitor a specific configuration item that is part of a given domain, such as a filesystem, a table space, a process, etc. Accordingly, a configuration aspect may include a name, a configuration item type, and a list of templates used to monitor the configuration item type. An example of a configuration aspect may be a database performance aspect for monitoring the performance of a database the name being "database performance aspect"; the configuration item type being "mysql", and the list of templates including database performance, database errors, database tablespace size, etc.

A metric template may be for monitoring a metric and trigger an alert if a given range is violated. For example, the metric template may define what the metric to be monitored is, and the range the metric is evaluated against. Accordingly, the metric template may include a name, a configuration item type, a metric name, a threshold, and a severity that indicates the seriousness level of the alert. An example of a metric template may be a database transaction rate that monitors the rate that transactions (e.g., read/write calls) are made in a database; the name being "database transaction rate"; the configuration item type being "mysql"; the metric name being "mysqltransactionrate"; the threshold being '200' (per second); and the severity being "major".

A logfile monitoring template may be used for monitoring a logfile and using a search pattern (e.g., word, phrase, set of character, etc.) to detect when an alert has been generated and logged in the logfile. The logfile may be evaluated to see if the search pattern is found in the logfile. Accordingly, the logfile monitoring template may include a name, a configuration item type, a logfile path (e.g., where the logfile is located in the filesystem of the client device 105), a search pattern, and a severity that indicates the seriousness level of the alert. An example of a logfile monitoring template may be a database error that monitors for any errors logged during use of a database: the name being "database error";

the configuration item type being "mysql"; the logfile path being "/var/log/mysql/mysql.log"; the pattern being "*Error*"; and the severity being "critical".

A configuration item type may be, for example, "mysql" in that the configuration item relates to the mysql database, or "db2" in that the configuration item relates to the db2 database. A configuration item of the "mysql" type may be "CustomerDatabase", which may be a specific instance of a mysql database. A configuration item of the "db2" type may be "SalesDatawarehouse", which may be a specific instance of a db2 database.

Figure 1B:
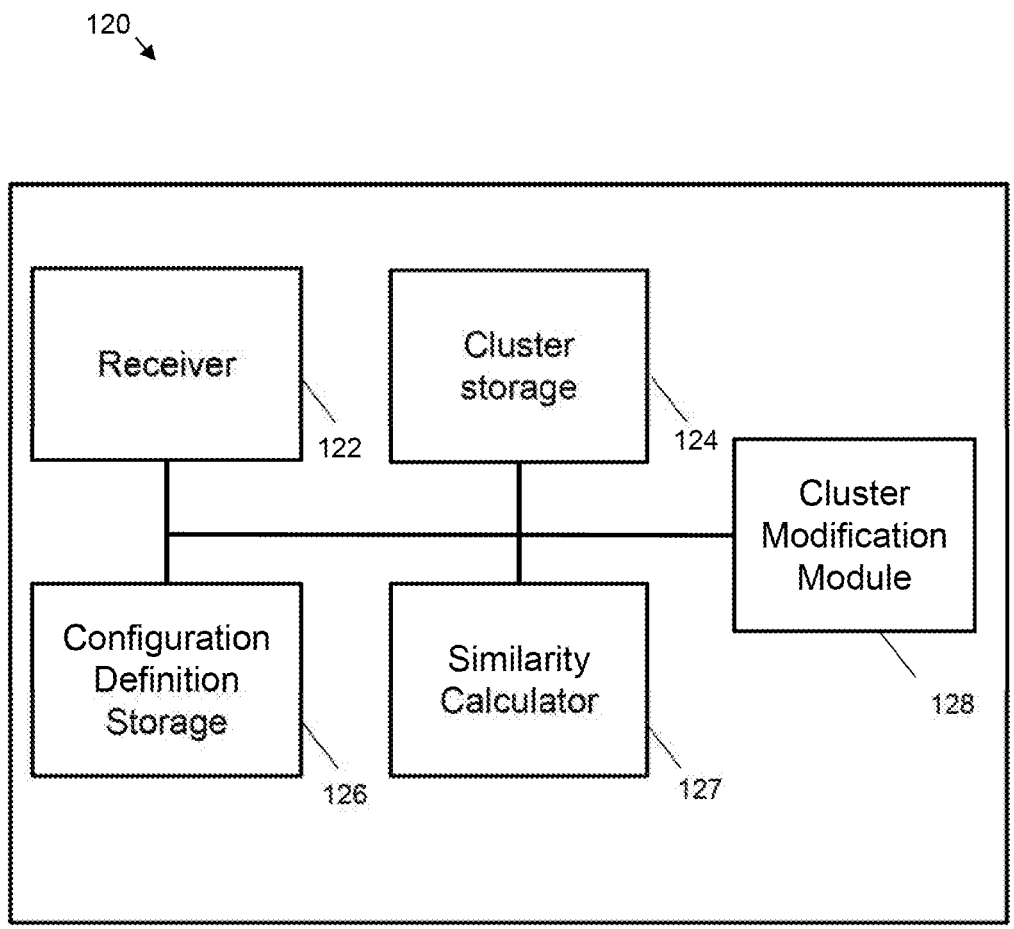
FIG. 1B is a schematic diagram showing a monitoring device according to an example.

FIG. 1B is a schematic diagram showing a monitoring device 120 according to an example. The monitoring device 120 includes a receiver 122. The receiver 122 is configured to receive information regarding a change made to an aspect of an application. For example, the receiver 122 is configured to receive from a client device 105 information regarding a change to at least one of a management package, configuration aspect, and template including a metric templates, and a logfile monitoring template. The receiver 122 may be a network interface card, wireless communication receiver, or wired communication receiver.

The monitoring device 120 further includes a cluster storage 124 configured to store a cluster of changes as described herein. The cluster storage 124 may be an appropriate non-transitory machine-readable storage medium as described herein. The monitoring device 120 further includes a configuration definition storage 126 configured to store information regard a change range associated with the cluster of changes. The configuration definition storage 126 may be an appropriate non-transitory machine-readable storage medium as described herein. In some examples, the cluster storage 124 and the configuration definition storage 126 may be the same physical non-transitory machine-readable storage medium.

The monitoring device 120 further includes a similarity calculator 127 configured to determine if a similarity of the change to an existing cluster of changes related to the aspect is within the change range. For example, the similarity calculator may receive information regarding the change from the receiver 122, information regarding the cluster of changes from the cluster storage 124, and information regarding the change range from the configuration definition storage 126. The similarity calculator 127 may be for example, a suitable processor of a special-purpose computer.

The monitoring device 120 further includes a cluster modification module 128 configured to associate the change with the cluster of changes when the similarity of the change is within the change threshold. For example, the cluster modification module may receive an indication from the similarity calculator 127 regarding the change being within the change threshold and accordingly direct storage of the change in the cluster storage 124 with the cluster of changes. The cluster modification module 128 may be, for example, a suitable processor of a special-purpose computer. In some examples, the similarity calculator 127 and the cluster modification module 128 may be the same processor of a special-purpose computer.

Figure 2:
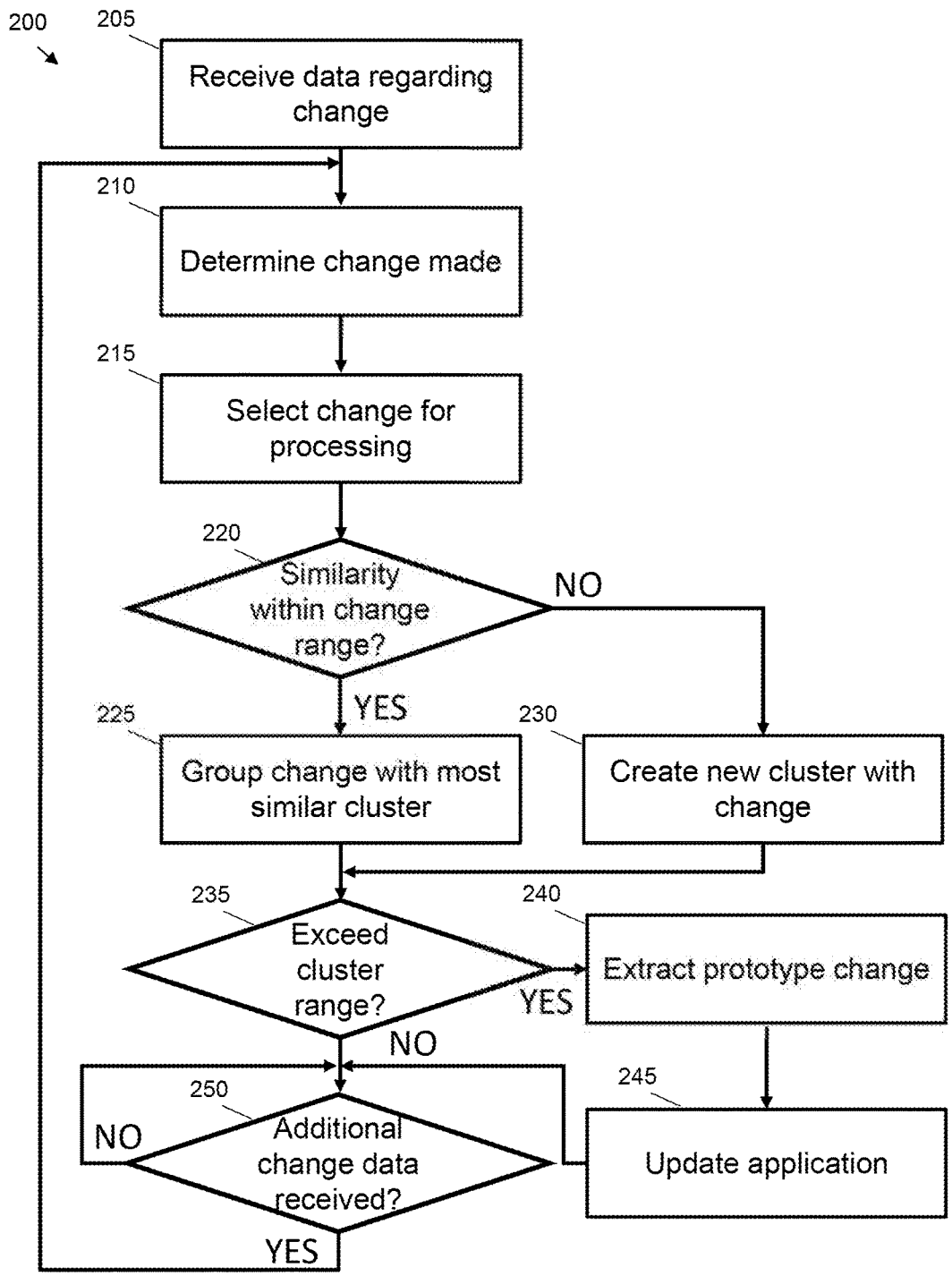
FIG. 2 shows an example of a method for monitoring changes to an application.

FIG. 2 shows an example of a method 200 for monitoring change in an application. The method 200 may be performed by the monitoring device 120. Certain steps may also be performed by the client devices 105 and/or one or more computer server devices.

At a block 205, data is received at the monitoring device 120 from the client devices 105. The data may be data, regarding a change or an aspect of a change in an application as described herein. Further, at a block 210, the data is analyzed by the monitoring device 120 to determine what change has been made to the application from the default settings.

Continuing, at a block 215, the determined change is selected for further processing. Further, at a block 220, it is determined whether the similarity of the selected change is within a change range of any existing clusters of changes. If the similarity of the selected change is within a change range of any existing clusters of changes, the method continues to a block 225. If the similarity of the selected change is not within a change range of any existing clusters of changes, the method continues to a block 230.

At the block 225, the selected change is grouped with the cluster of the existing clusters that the selected change is most similar. For example, the selected change is grouped with the cluster with which it has the smallest deviation in similarity from the initial change used to create the cluster. The method 200 then continues to the block 235.

At the block 230, a new cluster of changes is created with the selected change being the initial change in the cluster. The method 200 then continues to the block 235.

At the block 235, it is determined if the cluster with which the selected change is grouped includes a number of changes within a cluster range. In certain cases, this cluster range may be implemented as a threshold. If at the block 235, is determined that the number of changes is within a cluster range, the process continues to a block 240. If at the block 235, it is determined that the number of changes is not within a cluster range, the process continues to a block 250.

At the block 240, a prototype change is extracted from the cluster with which the selected change is grouped. This prototype change may be the change that has the highest similarity to all of the changes in the cluster (e.g., an average of all the changes). Continuing, at the block 245, the application is updated with the prototype change. Optionally, before the update of the application at the block 245, the prototype change may be validated by a human reviewer, that may accept or reject the change. If the human reviewer does not validate the change, the method 200 may skip over the block 245. Otherwise, the method 200 continues to the block 245, and the application is updated.

Continuing, at the block 250, it is determined if any data regarding an additional change is received from the client devices 105. If it is determined that data regarding an additional change is received from the client devices 105, the method 200 returns to the block 210. If it is determined that no data regarding an additional change is received from the client devices 105, the method 200 returns to the block 250.

In some examples, after the application is updated, the monitoring service 20 may further notify customers of the update, such as via the client devices 105. Further, the customers may receive and install the update from the monitoring service 120.

It should be noted that though method 200 is described with certain blocks in a certain order, other similar methods for monitoring updates to an application may be used as would be understood by one of skill in the art.

The similarity of changes in the application may be based on a similarity score calculated between changes, where a lower score (or higher in other examples based on the calculations used) may mean the changes are more similar. For example, the overall similarity score of a metric template to another metric template may be calculated based on individual similarity scores including name change similarity, configuration item type similarity, metric name change similarity, threshold change similarity, and/or severity similarity.

In another example, the overall similarity score of a logfile monitoring template to another logfile monitoring template may be calculated based on individual similarity scores including name change similarity, configuration item type similarity, logfile path similarity, and/or pattern change similarity. One or more similarity measures that may be used to calculate these similarity scores are described below.

In yet another example, the overall similarity score of a management package to another management package may be calculated based on individual similarity scores including name change similarity, configuration item type similarity, and template similarity (the similarity of the changed templates associated with the management package).

In a further example, the overall similarity score of a configuration aspect to another configuration aspect may be calculated based on individual similarity scores including name change similarity, configuration item type similarity, and template similarity (the similarity of the changed templates associated with the configuration aspect).

Each of these individual similarity scores (except threshold change similarity, severity similarity, and template similarity) may be calculated based on similarity of the text strings (e.g., name, configuration item type, metric name). The similarity of the strings may be calculated using similarity functions, such as those used by spell checkers (e.g., a string based similarity function). For example, the similarity of two different text strings "t1" and "t2" may be calculated by the following formula (wherein the Levenshtein distance is a known string metric for measuring the difference between two string sequences "t1", "t2" and the maximum Levenshtein distance is a maximum possible distance between the two string sequences):

$$100-(\text{LevenshteinDistance}(t1,t2)/\text{maximumLevenshteinDistance}(t1,t2))$$

The individual similarity score for a threshold change or severity similarity may be based on the absolute percentage of change of the threshold or severity level. In another example, the threshold change or severity similarity may further be based on the direction of the change of the threshold or severity level. For example, the similarity of two numbers "d1" and "d2" that can have a maximum value "max" may be calculated by the following formula:

$$100-((d1-d2)^2*100/(\text{max}^2))$$

The template similarity may be calculated as an average similarity (e.g., weighted average) of each template. For example, metric name may be given a lower weight (e.g., 10), logfile path a higher weight (e.g., 50), and configuration item type a medium weight (e.g., 30).

Each of the overall similarity scores may be any one of a sum, average, weighted average, weighted sum, etc. of the relevant individual similarity scores.

Figure 3A:
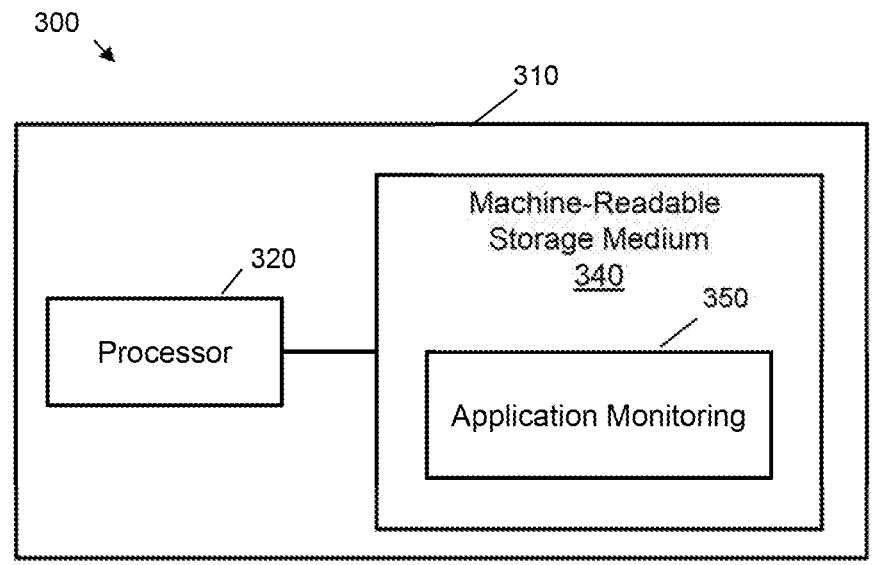
FIG. 3A is a schematic diagram showing a computing device according to an example.

Certain methods and systems as described herein may be implemented by a processor that processes instructions that are stored in a non-transitory machine-readable storage medium. FIG. 3A shows an example 300 of computing device 310 (e.g., monitoring device 120, client device 105, etc.) comprising a non-transitory machine-readable storage medium 340 coupled to a processor 320 (e.g., at least one processor). In certain cases the computing device 310 may comprise a special-purpose computer or the like. Machine-readable media 340 can be any non-transitory media that can contain, store, or maintain programs and data for use by or in connection with the processor 320, or another suitable processor. Machine-readable storage media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 3A, the machine-readable storage medium may comprises program code to implement an application or an application monitoring method 350 such as the method 200, method 400, or the method described with respect to FIG. 3B. Similarly, it should be understood that the monitoring device 120, client device 105, method 200, method 400, or the method described with respect to FIG. 3B may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least an image filter as described above. In this regard, the described examples may be implemented at least in part by computer program code stored in (non-transitory) machine-readable storage media and executable by the processor, or by hardware, or by a combination of tangibly stored code and hardware (and tangibly stored firmware).

For example, in one case the computer-readable instructions, when executed by a processing system, cause the processing system to receive information regarding a change made to an aspect of an application. They may further cause the processing system to determine if a similarity of the change to a cluster of changes related to the aspect is within a change range. They may further cause the processing system to associate the change with the cluster of changes when the similarity of the change is within the change range. They may further cause the processing system to determine if a metric, based on a number of changes associated with the cluster of changes is within a cluster range. They may further cause the processing system to extract a prototype change from the cluster of changes when the metric is within the cluster range. They may further cause, the processing system to update the application based on the prototype change when the metric is within the cluster range.

Figure 3B:
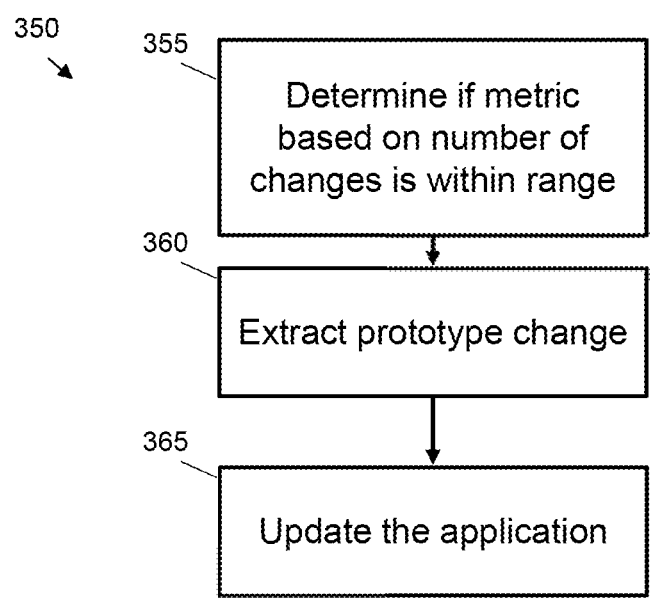
FIG. 3B shows an example of an application monitoring method.

FIG. 3B shows an example of the application monitoring method 350 for updating an application. At a block 355 the processor 320 executing the method 350 determines if a metric based on a number of changes associated with a cluster of changes is within a cluster range.

At the block 360, the processor 320 executing the method 350, extracts a prototype change from the cluster of changes when the metric is within the cluster range. Further, at a block 365, the processor 320 executing the method 350, updates the application based on the prototype change when, the metric is within the cluster range.

Figure 4:
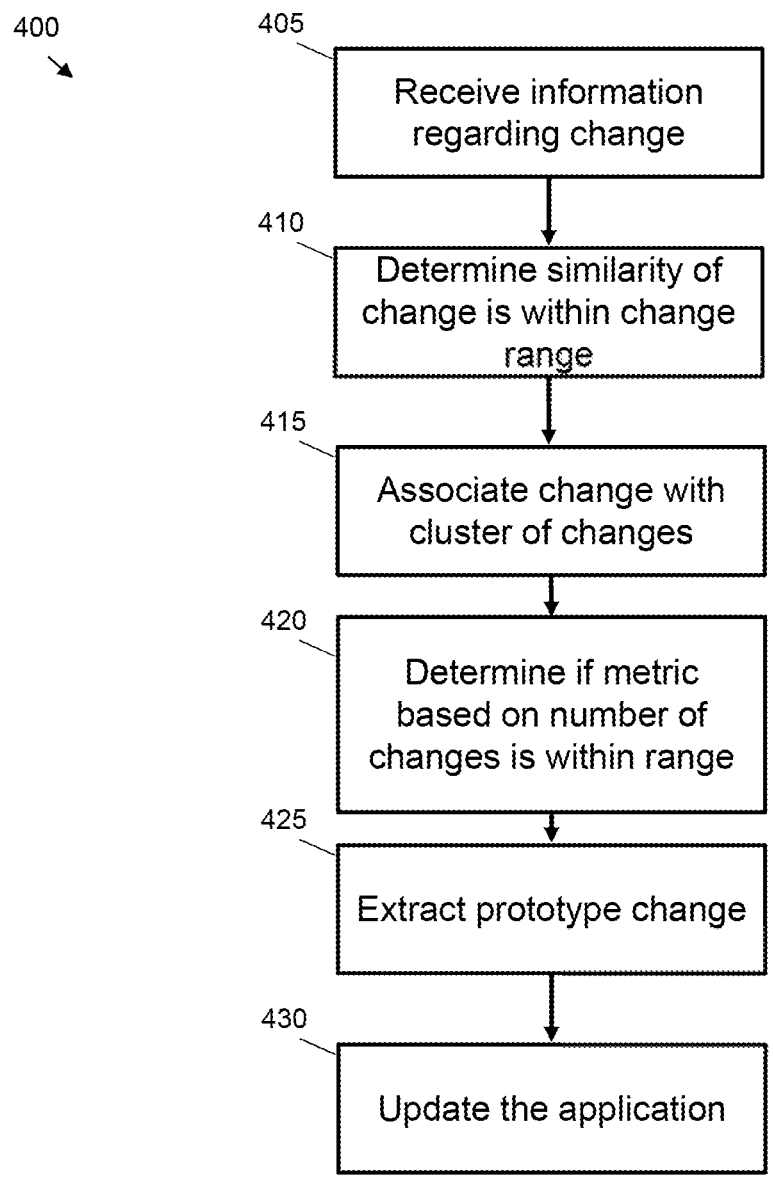
FIG. 4 shows an example of a method for monitoring change in an application.

FIG. 4 shows an example of a method 400 for monitoring change in n application. The method 400 may be performed by the monitoring device 120. Certain steps may also be performed by the client devices 105 and/or one or more computer server devices.

At a block 405, the monitoring device 120 receives information regarding a change made to an aspect of an application from the client devices 105. Further, at block 410, the monitoring device 120 determines if a similarity of the change to a cluster of changes related to the aspect is within a change range.

Continuing, at a block 415, the monitoring device 120 associates the change with the cluster of changes when the simiiarity of the change is within the change range. Further, at a block 420 the monitoring device 120 determines if a metric based on a number of changes associated with the cluster of changes is within a cluster range.

At the block 425, the monitoring device 120, or another computer server device, extracts a prototype change from the cluster of changes when the metric is within the cluster range. Further, at a block 430, the monitoring device 120, or another computer server device, updates the application based on the prototype change when the metric is within the cluster range.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method performed by a system comprising a hardware processor, comprising:
receiving information regarding a change made to an aspect of an application;
determining if a similarity of the change to a cluster of changes made to the aspect of the application is within a change range;
associating the change with the duster of changes responsive to the similarity of the change to the cluster of changes being within the change range;
determining if a metric based on a number of changes associated with the cluster of changes and occurring within a specified time duration exceeds a cluster threshold;
selecting a prototype change from the cluster of changes responsive to the metric exceeding the cluster threshold, wherein the selecting of the prototype change comprises:
determining a respective similarity of each corresponding change of the cluster of changes to other changes of the cluster of changes, to produce a plurality of determined similarities for corresponding changes of the cluster of changes,
comparing the plurality of determined similarities, and
based on the comparing, identifying a change, from the cluster of changes, that satisfies a similarity criterion with respect to other changes of the cluster of changes; and
updating the application with the prototype change responsive to the metric exceeding the cluster threshold.

2. The method of claim 1, wherein the aspect comprises at least one of a management package, a configuration aspect, or a template.

3. The method of claim 1, wherein determining if the similarity of the change to the cluster of changes is within the change range comprises utilizing a string based similarity function.

4. The method of claim 1, wherein the identifying of the change that satisfies the similarity criterion with respect to the other changes of the cluster of changes comprises identifying the change that has a lowest average similarity to the other changes of the cluster of changes.

5. The method of claim 1, wherein the change made to the aspect of the application comprises a change to a configuration setting of the application, and the cluster of changes made to the aspect comprises a cluster of changes to the configuration setting of the application, wherein determining if the similarity is within the change range comprises determining if the change to the configuration setting of the application is similar within the change range to the cluster of changes to the configuration setting of the application, wherein the prototype change comprises a selected change in the configuration setting selected from among the cluster of changes to the configuration setting of the application, and wherein the updating comprises updating the application by making the selected change in the configuration setting of the application.

6. The method of claim 1, wherein the identifying of the change that satisfies the similarity criterion with respect to the other changes of the cluster of changes comprises identifying the change that has a highest similarity to the other changes of the cluster of changes.

7. A system comprising:
a processor; and
a non-transitory storage medium storing instructions executable on the processor to:
receive information regarding a change made to an aspect of an application;
determine if a similarity of the change to a cluster of changes made to the aspect of the application is within a change range;
associate the change with the cluster of changes in response to the similarity of the change to the cluster of changes being within the change range;
determine if a metric based on a number of changes associated with the cluster of changes and occurring within a specified time duration exceeds a cluster threshold;
select a prototype change from the cluster of changes, wherein the selecting of the prototype change comprises:
determine a respective similarity of each corresponding change of the cluster of changes to other changes of the cluster of changes, to produce a plurality of determined similarities for corresponding changes of the cluster of changes,
compare the plurality of determined similarities, and based on the comparing, identify a change, from the cluster of changes, that satisfies a similarity criterion with respect to other changes of the cluster of changes; and update the application with the prototype change.

8. The system of claim 7, wherein the aspect comprises at least one of a management package, a configuration aspect, or a template.

9. The system of claim 7, wherein the instructions are executable on the processor to determine if the similarity of the change to the cluster of changes is within the change range by utilizing a string based similarity function.

10. The system of claim 7, wherein the change made to the aspect of the application comprises a change to a configuration setting of the application, and the cluster of changes comprises a cluster of changes to the configuration setting of the application, wherein determining if the similarity is within the change range comprises determining if the change to the configuration setting of the application is similar within the change range to the cluster of changes to the configuration setting of the application, wherein the prototype change comprises a selected change in the configuration setting selected from among the cluster of changes to the configuration setting of the application, and wherein the updating the application comprises updating the application by making the selected change in the configuration setting of the application.

11. The system of claim 7, wherein the identifying of the change that satisfies the similarity criterion with respect to the other changes of the cluster of changes comprises identifying, based on the comparing, the change that has a highest similarity to the other changes in the cluster of changes.

12. A non-transitory machine-readable storage medium comprising machine-readable instructions which when executed cause a processing system to:
    receive information regarding a change made to an aspect of an application;
    determine if a similarity of the change to a cluster of changes made to the aspect of the application is within a change range;
    associate the change with the cluster of changes in response to the similarity of the change to the cluster of changes being within the change range;
    determine if a metric based on a number of changes associated with the cluster of changes within a specified time duration exceeds a cluster threshold;
    select a prototype change from the cluster of changes in response to determining that the metric exceeds the cluster threshold, wherein the selecting of the prototype change comprises:
        determining a respective similarity of each corresponding change of the cluster of changes to other changes of the cluster of changes, to produce a plurality of determined similarities for corresponding changes of the cluster of changes,
        comparing the plurality of determined similarities, and
        based on the comparing, identifying a change, from the cluster of changes, that satisfies a similarity criterion with respect to other changes of the cluster of changes; and
    update the application with the prototype change responsive to the metric exceeding the cluster threshold.

13. The non-transitory machine-readable storage medium of claim 12, wherein the identifying of the change that satisfies the similarity criterion with respect to the other changes of the cluster of changes comprises identifying, based on the comparing, the change that has a lowest average similarity to the other changes of the cluster of changes.

14. The non-transitory machine-readable storage medium of claim 12, wherein the aspect of the application comprises at least one of a management package, a configuration aspect, or a template.

15. The non-transitory machine-readable storage medium of claim 12, wherein determining if the similarity of the change to the cluster of changes is within the change range comprises utilizing a string based similarity function.

16. The non-transitory machine-readable storage medium of claim 12, wherein the change made to the aspect of the application comprises a change to a configuration setting of the application, the cluster of changes comprises a cluster of changes to the configuration setting of the application, and
    wherein determining if the similarity is within the change range comprises determining if the change to the configuration setting of the application is similar within the change range to the cluster of changes to the configuration setting of the application, wherein the prototype change comprises a selected change in the configuration setting selected from among the cluster of changes to the configuration setting of the application, and wherein the updating comprises updating the application by making the selected change in the configuration setting of the application.

* * * * *